(12) United States Patent
Honda et al.

(10) Patent No.: US 9,050,886 B2
(45) Date of Patent: Jun. 9, 2015

(54) EXHAUST VALVE DEVICE FOR FUEL TANK

(71) Applicant: NIFCO INC., Yokohama-shi, Kanagawa (JP)

(72) Inventors: Itsuo Honda, Kamakura (JP); Shunpei Nabeya, Sagamihara (JP)

(73) Assignee: NIFCO INC., Yokohama-shi, Kanagawa (JP)

( * ) Notice: Subject to any disclaimer, the term of this patent is extended or adjusted under 35 U.S.C. 154(b) by 0 days.

(21) Appl. No.: 14/347,427

(22) PCT Filed: Nov. 2, 2012

(86) PCT No.: PCT/JP2012/007046
§ 371 (c)(1),
(2) Date: Mar. 26, 2014

(87) PCT Pub. No.: WO2013/069239
PCT Pub. Date: May 16, 2013

(65) Prior Publication Data
US 2014/0224820 A1    Aug. 14, 2014

(30) Foreign Application Priority Data
Nov. 11, 2011    (JP) .................................. 2011-247692

(51) Int. Cl.
| | |
|---|---|
| *B60K 15/035* | (2006.01) |
| *F16K 24/04* | (2006.01) |
| *F02M 25/08* | (2006.01) |
| *B60K 15/03* | (2006.01) |

(52) U.S. Cl.
CPC ......... *B60K 15/03504* (2013.01); *F16K 24/044* (2013.01); *F02M 25/0872* (2013.01); *B60K 2015/03289* (2013.01); *B60K 2015/03542* (2013.01); *B60K 15/03519* (2013.01)

(58) Field of Classification Search
CPC ........... B60K 15/03504; B60K 15/035; B60K 2015/03289; B60K 2015/03256
USPC ............ 220/746, 745, 203.2, 203.19, 203.01; 137/397, 583, 589
See application file for complete search history.

(56) References Cited

U.S. PATENT DOCUMENTS

| | | | |
|---|---|---|---|
| 5,680,848 A * | 10/1997 | Katoh et al. ................. | 123/518 |
| 5,722,468 A | 3/1998 | Kido | |
| 2010/0200079 A1 | 8/2010 | Matsuzaki et al. | |

FOREIGN PATENT DOCUMENTS

| | | |
|---|---|---|
| JP | 2000-345933 A | 12/2000 |
| JP | 2007-333136 A | 12/2007 |
| JP | 2010-105523 A | 5/2010 |

\* cited by examiner

*Primary Examiner* — Robert J Hicks
(74) *Attorney, Agent, or Firm* — Manabu Kanesaka

(57) ABSTRACT

An exhaust valve device for a fuel tank includes a casing partitioning an inside into an upper chamber and a lower chamber by a bulkhead including a through hole, an inflow hole communicating the lower chamber and an inside of the fuel tank, an exhaust hole communicating a side portion of the upper chamber and an outside of the fuel tank, and a float valve displaceably supported in the lower chamber. A portion defining the upper chamber of the casing includes a cylinder portion and a circular plate closing an upper end of the cylinder portion. A buffer chamber is defined between the cylinder body and the bulkhead to communicate with the lower chamber by the through hole. In a side wall on a side opposing an exhaust hole side of the cylinder body, a first ventilation hole communicating the buffer chamber and the upper chamber is formed.

4 Claims, 10 Drawing Sheets

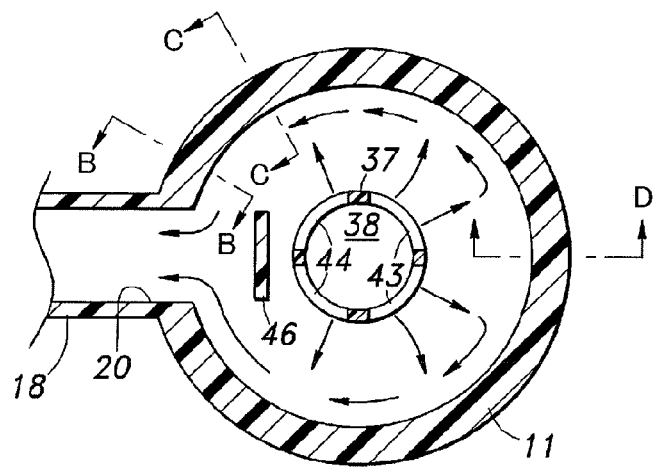
Fig. 10(A)
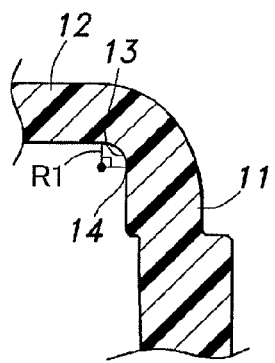 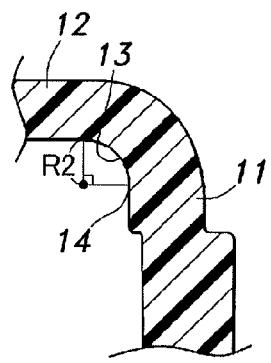 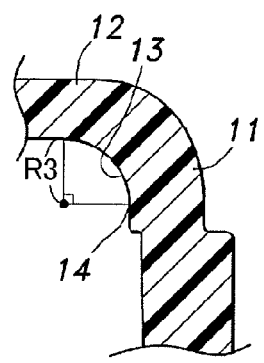
Fig. 10(B)     Fig. 10(C)     Fig. 10(D)

EXHAUST VALVE DEVICE FOR FUEL TANK

RELATED APPLICATIONS

The present application is National Phase of International Application No. PCT/JP2012/007046 filed Nov. 2, 2012, and claims priority from Japanese Application No. 2011-247692, filed Nov. 11, 2011.

FIELD OF TECHNOLOGY

The present invention relates to an exhaust valve device for a fuel tank, and more specifically, relates to a valve device closing an exhaust pathway according to a liquid level of a fuel inside a fuel tank.

BACKGROUND ART

There is a device forming a through hole on an upper wall of the fuel tank, and attaching the exhaust valve device to the through hole (for example, Patent Document 1). The exhaust valve device internally comprises a float valve moving up and down according to the liquid level of a liquid fuel. The float valve is located downward inside the exhaust valve device at a normal time when the liquid level of the fuel is low so as to open a pathway. Thereby, through the exhaust valve device, gas (including air and fuel vapor) inside the fuel tank can flow out into a canister provided outside a tank. On the other hand, in a case wherein the liquid level of the fuel is high, the float valve receives buoyancy from the fuel and ascends inside the exhaust valve device so as to block the pathway. Thereby, the liquid fuel is controlled from leaking to an outside through the exhaust valve device.

In a case wherein the liquid level inside the fuel tank rapidly ascends, or in a case wherein there are many air bubbles on a liquid surface so as to spew the liquid fuel up, there is a problem that the float valve ascends and the liquid fuel passes through the pathway prior to closing the pathway. With respect to that problem, in the Invention according to the Patent Document 1, there is provided a barrier in a downstream side (an outward side of the fuel tank) portion more than a portion of the pathway closed by the float valve so as to prevent the liquid fuel from flowing. Specifically, the exhaust valve device according to the Patent Document 1 has a cylindrical shape extending in an up-and-down direction, and the inside of the pathway is partitioned into an upper chamber and a lower chamber by a bulkhead. In a side portion of the upper chamber, there is provided an exhaust port communicating with the outside. In the center of the bulkhead, there is formed the through hole communicating the upper chamber and the lower chamber. In a hole edge portion on an upper chamber side of the through hole, there is projected the cylindrical barrier in such a way as to surround the through hole leaving a side opposing an exhaust port side. Thereby, the liquid fuel passed through the through hole is blocked by the barrier so as not to directly flow into the exhaust port.

PRIOR ART DOCUMENT

Patent Document

Patent Document 1: Japanese Unexamined Patent Publication No. 2007-333136

SUMMARY OF THE INVENTION

Problems to be Solved by the Invention

In the aforementioned device, however, there is a problem that a circulation of a gas fuel is also blocked by providing the barrier. At a fueling time, in a case wherein the gas inside the fuel tank is not smoothly discharged through the exhaust valve device, the liquid fuel cannot smoothly flow into the tank. By increasing the volume inside the upper chamber, an area in a cross section of a flow passage of the gas is increased so as to lower an impact by the barrier. However, the device increases in size so as to be undesirable.

The present invention is made in view of the aforementioned backgrounds, and in the exhaust valve device for a fuel tank, an object of the present invention is to control a leakage of the liquid fuel while smoothly circulating the gas without increasing the device in size.

Means for Solving the Problems

In order to attain the aforementioned object, the present invention is an exhaust valve device for a fuel tank (1) comprising casings (2, 3, and 4) provided to pass through an upper wall (101) of a fuel tank (100), and partitioning an inside into an upper chamber (41) and a lower chamber (42) by a bulkhead (35) including a through hole (36); an inflow hole (54) communicating the lower chamber and an inside of the fuel tank; an exhaust hole (20) communicating a side portion of the upper chamber and an outside of the fuel tank; and a float valve (5) displaceably supported in the lower chamber, and ascending by receiving buoyancy from a fuel flown into the lower chamber through the inflow hole so as to close the through hole. A portion defining the upper chamber of the casing includes a cylinder portion (11) and a circular plate (12) closing an upper end of the cylinder portion, and the exhaust hole is formed in the cylinder portion. In the upper chamber side of the bulkhead, there is provided a cylinder body (37) whose upper portion is closed to cover the through hole approximately in the same shaft as the cylinder portion. A buffer chamber (38) is defined between the cylinder body and the bulkhead, and the buffer chamber communicates with the lower chamber by the through hole. In a side wall on a side opposing the exhaust hole side of the cylinder body, there is formed a first ventilation hole (43) communicating the buffer chamber and the upper chamber, and at a boundary portion between an inner circumferential face of the cylinder portion and a lower face of the circular plate, there is extended a corner portion (13) having a curved surface shape smoothly connecting between the inner circumferential face of the cylinder portion and the lower face of the circular plate. A curvature of the corner portion is the smallest on a side opposing a side forming the exhaust hole, and gradually increases as moving toward the side forming the exhaust hole in a circumferential direction.

According to the structure, since the curvature of the corner portion of a portion facing the first ventilation hole is small, gas flown into the upper chamber through the first ventilation hole can easily flow smoothly along the corner portion. Namely, at the portion facing the first ventilation hole of the corner portion, a flow of the gas becomes difficult to be blocked, and difficult to remain so as to control a pressure reduction. Also, the curvature of the corner portion is small on the side opposing the exhaust port (the side facing the first ventilation hole), and is large on an exhaust port side so as to control a decrease of a volume of the upper chamber, and to ensure an area in a cross section of a flow passage of the gas.

Another aspect of the present invention is that in the side wall on the exhaust hole side of the cylinder body, there is formed a second ventilation hole (44) having an opening area smaller than that of the first ventilation hole.

According to the structure, the gas flows through the second ventilation hole in addition to the first ventilation hole so as to reduce a pressure loss of the gas. Also, the second ventilation hole has the opening area smaller than that of the first ventilation hole, so that the gas flows mainly from the first ventilation hole, and flows secondarily from the second ventilation hole.

Another aspect of the present invention is that in the upper chamber side portion of the bulkhead and in a portion located between the second ventilation hole and the exhaust hole, there is projected a baffle wall (46) facing the second ventilation hole.

According to the structure, a flow of a liquid fuel from the second ventilation hole to the exhaust hole can be controlled by the baffle wall.

Another aspect of the present invention is that a portion on the upper chamber side of the bulkhead is formed in a conical face shape in which a portion provided with the through hole is concaved to the lower chamber side.

According to the structure, the liquid fuel flown into the upper chamber unintentionally can be led to a through hole side so as to return to the lower chamber.

EFFECT OF THE INVENTION

According to the aforementioned structures, the exhaust valve device for a fuel tank can control a leakage of the liquid fuel while smoothly circulating the gas without increasing the device in size.

BRIEF DESCRIPTION OF THE DRAWINGS

FIG. 10(A) is a schematic diagram showing a flat cross section of an upper chamber; FIG. 10(B) is a cross-sectional view taken along a line B-B in FIG. 10(A); FIG. 10(C) is a cross-sectional view taken along a line C-C in FIG. 10(A); and FIG. 10(D) is a cross-sectional view taken along a line D-D in FIG. 10(A).

BEST MODES OF CARRYING OUT THE INVENTION

Hereinafter, with reference to drawings, an embodiment wherein the present invention is applied to an exhaust valve device used for a fuel tank of an automobile will be explained in detail. An up-and-down direction (a vertical direction) is determined based on a coordinate shown in figures.

Figure 1:
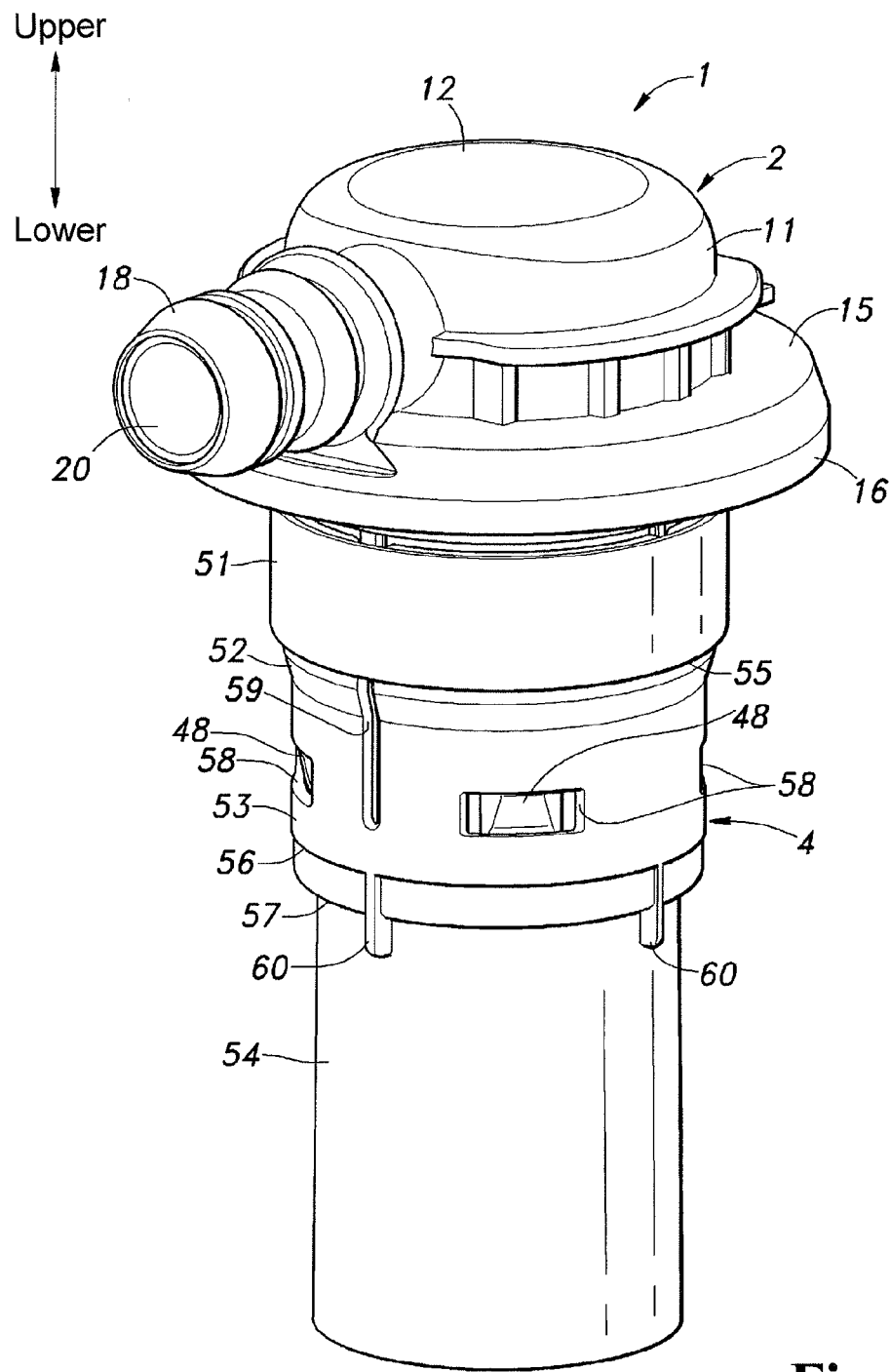
FIG. 1 is a perspective view of an exhaust valve device for a fuel tank.
Figure 2:
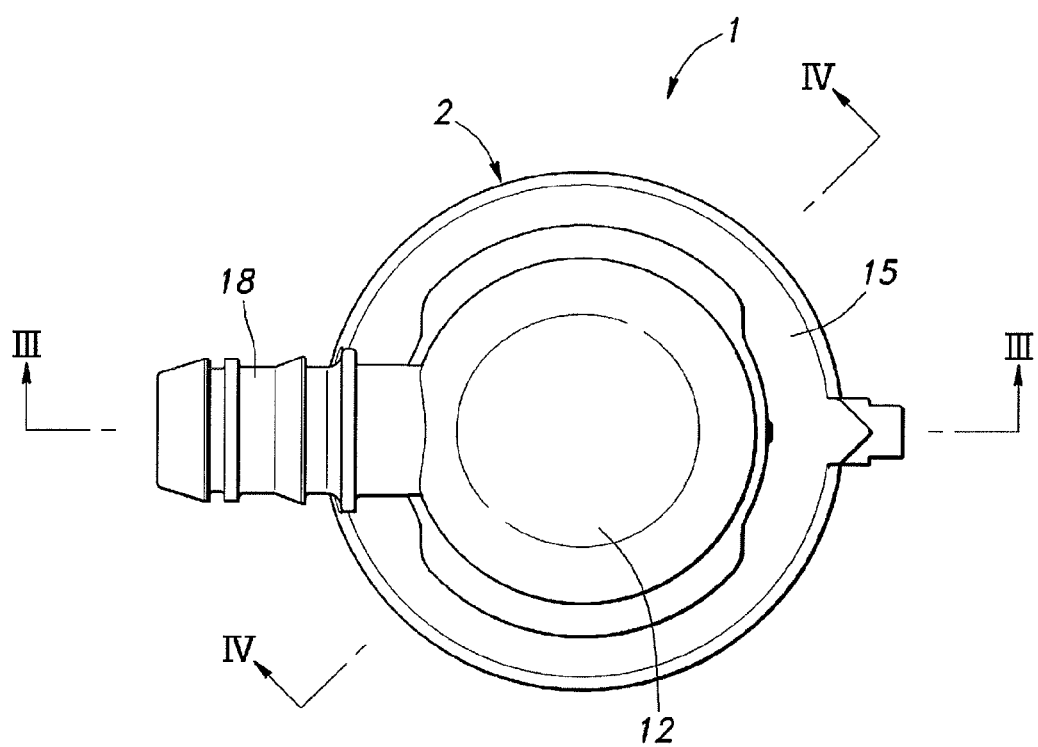
FIG. 2 is a plan view of the exhaust valve device for a fuel tank.

As shown in FIG. 1, an exhaust valve device 1 according to the embodiment is formed by combining a first casing 2, a second casing 3, a third casing 4, and a float valve 5.

Figure 3:
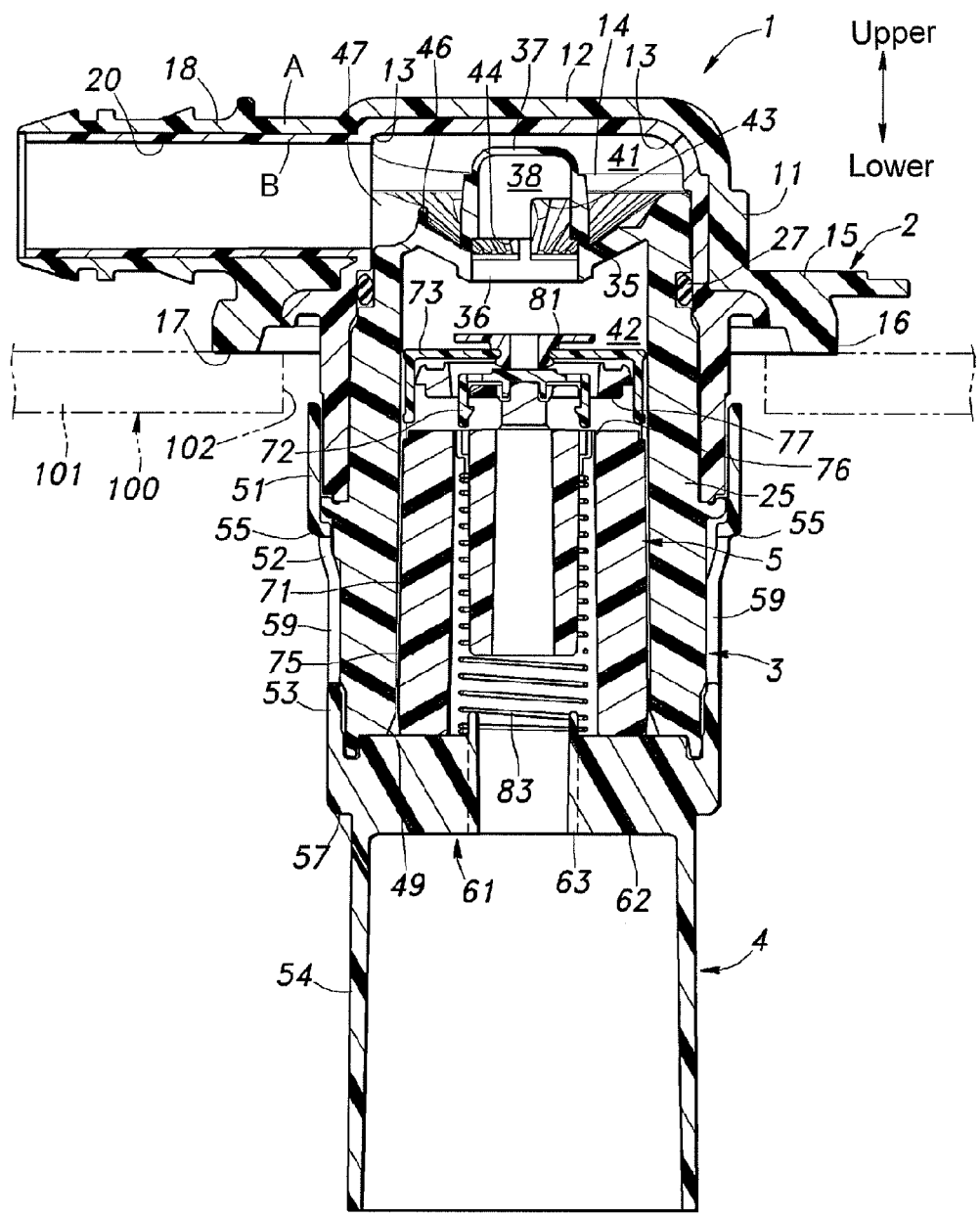
FIG. 3 is a cross-sectional view taken along a line in FIG. 2, and shows an open valve state.
Figure 4:
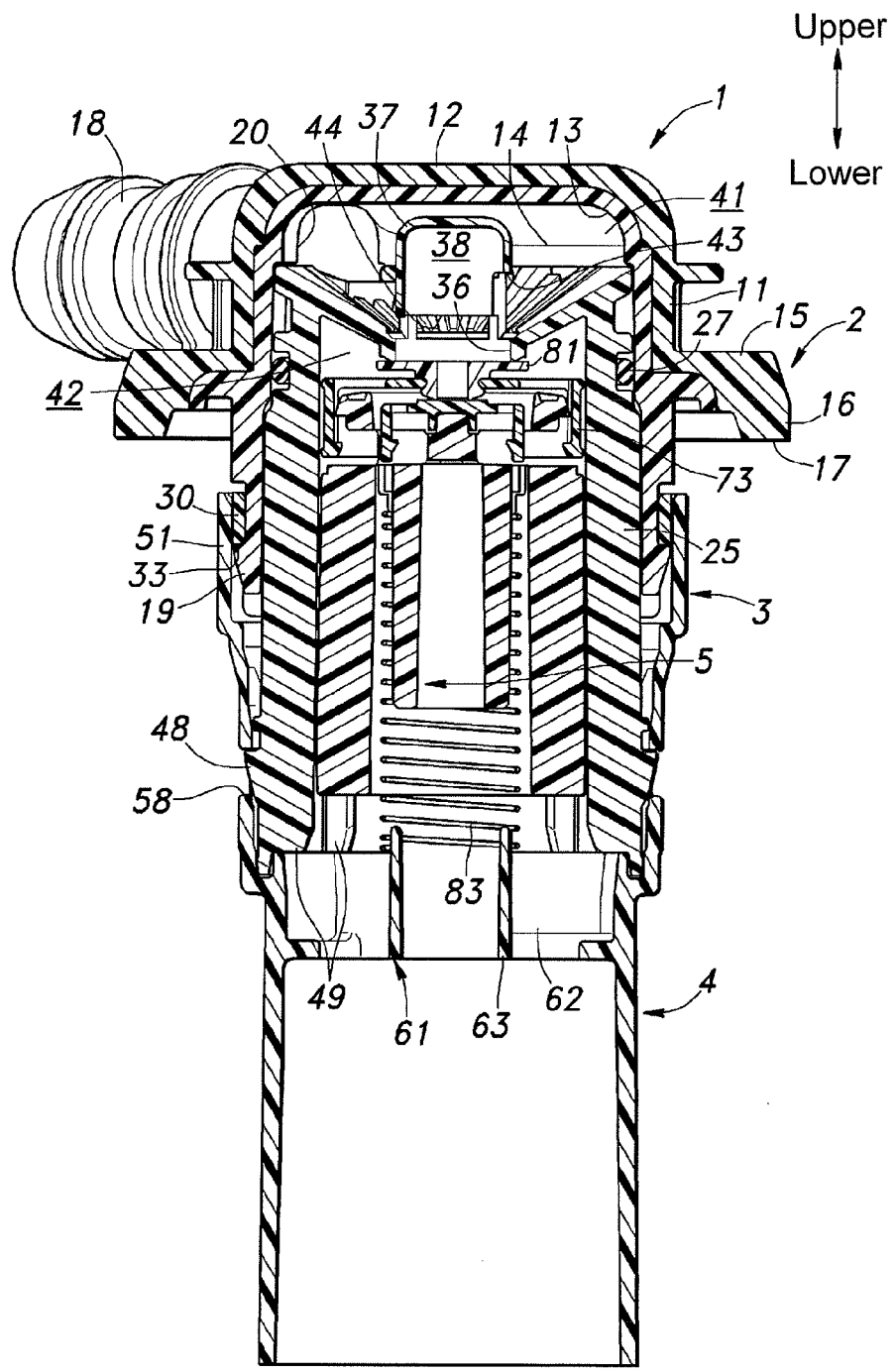
FIG. 4 is a cross-sectional view taken along a line IV-IV in FIG. 2, and shows a closed valve state.
Figure 5:
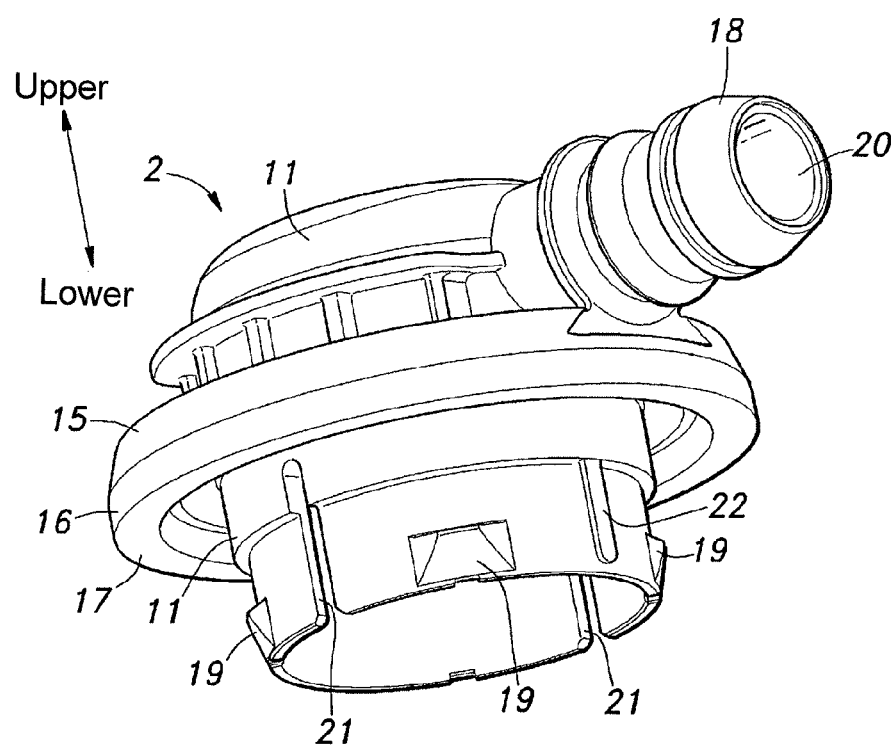
FIG. 5 is a perspective view of a first casing.

The first casing 2 is integrally formed by a first resin which can carry out thermal welding and a second resin having poor hydrocarbon permeability by a two-color forming method. The first resin is, for example, a high-density polyethylene (HDPE), and the second resin is, for example, an ethylene-vinylalcohol copolymer. As shown in FIGS. 2 to 5, the first casing 2 includes a cylinder portion 11 whose shaft line extends in the up-and-down direction. In the cylinder portion 11, while an upper end is closed by a circular plate 12 orthogonal to the shaft line of the cylinder portion 11, a lower end is open. At a boundary between an inner circumferential face of the cylinder portion 11 and a lower face of the circular plate 12, there is extended a corner portion 13 along the boundary. An inner face of the corner portion 13 has a curved surface smoothly connecting between the inner circumferential face of the cylinder portion 11 and the lower face of the circular plate 12. As shown in FIGS. 3 and 4, a shape of the inner face in a cross section of the corner portion 13 has a 90-degree circular arc. A curvature of the corner portion 13 changes in a circumferential direction of the cylinder portion 11. An upper edge of the corner portion 13 is a boundary with the lower face of the circular plate 12, and at each portion in the circumferential direction of the cylinder portion 11, a position in a shaft line direction of the cylinder portion 11 is constant. On the other hand, in a lower edge (i.e., a boundary between the corner portion 13 and the cylinder portion 11) 14 of the corner portion 13, at each portion in the circumferential direction of the cylinder portion 11, the position in the shaft line direction of the cylinder portion 11 changes. A boundary between an outer circumferential face of the cylinder portion 11 and an upper face of the circular plate 12 has a chamfered curved surface.

In an intermediate portion in a longitudinal direction of the outer circumferential face of the cylinder portion 11, there is formed a circular flange 15 projecting outward in a radial direction. In a circumferential edge portion of the flange 15, there is projected a wall portion 16 downward. The wall portion 16 is annularly formed along the circumferential edge portion of the flange 15, and a lower end thereof is a joint surface 17 which is a flat surface facing downward.

In a portion higher than the flange 15 of the cylinder portion 11, there is provided a circular pipe-shaped exhaust pipe 18 projecting outward in the radial direction. A base end of an exhaust port 20 formed by an inner hole of the exhaust pipe 18 communicates with an inside of the cylinder portion 11. In the present embodiment, an upper edge of the base end of the exhaust port 20 is disposed in the upper end of the cylinder portion 11, i.e., in a position biased lower than the lower edge of the corner portion 13. Incidentally, in another embodiment, an edge portion of the base end of the exhaust port 20 may cross across the lower edge 14 of the corner portion 13. A lower portion of a base end of the exhaust pipe 18 continues to an upper face of the flange 15. In an outer circumferential face of an end of the exhaust pipe 18, there is formed a plurality of protrusions for connecting to a hose or a hose coupler.

As shown in FIGS. 3, 4, and 10, the corner portion 13 is formed such that in the circumferential direction, the curvature is the smallest (a curvature radius is large) on a side opposing the exhaust port 20, and that the curvature gradually increases as moving to an exhaust port side along the circumferential direction. As shown in FIG. 10, the curvature radius on the side opposing the exhaust port 20 of the corner portion 13 is R3, and as moving to an exhaust port 20 side, the curvature radius gradually decreases to R2 and R1 (R3>R2 >R1). Consequently, the lower edge 14 of the corner portion 13 is displaced upward as moving from the side opposing the exhaust port 20 to the exhaust port 20 side.

In an outer circumferential face of a portion lower than the flange 15 of the cylinder portion 11, there is projected a plurality of first-casing-side locking claws 19. Each first-casing-side locking claw 19 includes an inclination face projecting outward in the radial direction as moving upward from a lower end; and a non-return face continuing to an upper end of the inclination face and facing upward. In the present embodiment, four first-casing-side locking claws 19 are provided at 90-degree intervals in the circumferential direction of the cylinder portion 11. Also, in the cylinder portion 11, there are formed slits 21 extending upward from the lower end in appropriate places. Each slit 21 has an effect of allowing stress to escape when each member forming the exhaust valve device 1 is wet by a fuel. Also, in an outer circumferential face of the cylinder portion 11, there are projected guide ribs 22 extending in the up-and-down direction in appropriate places.

The first resin integrally forms an outer circumferential portion of an upper portion of the cylinder portion 11; an upper surface portion of the circular plate 12; an outer circumferential portion of the exhaust pipe 18; the flange 15; and the wall portion 16 (hatching portions shown by a reference symbol A in FIGS. 3 and 4). The second resin integrally forms an inner circumferential portion of the upper portion of the cylinder portion 11; a lower portion of the cylinder portion 11; a lower face portion of the circular plate 12; an inner circumferential portion of the exhaust pipe 18; and a lower face portion of a base end of the flange 15 (hatching portions shown by a reference symbol B in FIGS. 3 and 4).

Figure 6:
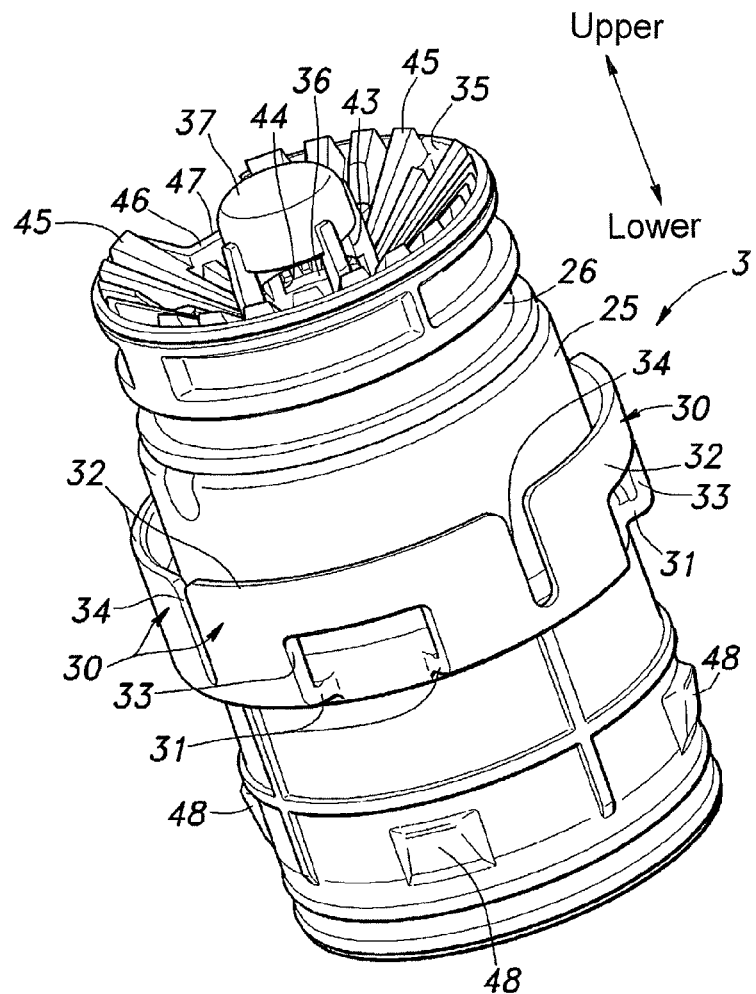
FIG. 6 is a perspective view of a second casing.
Figure 7:
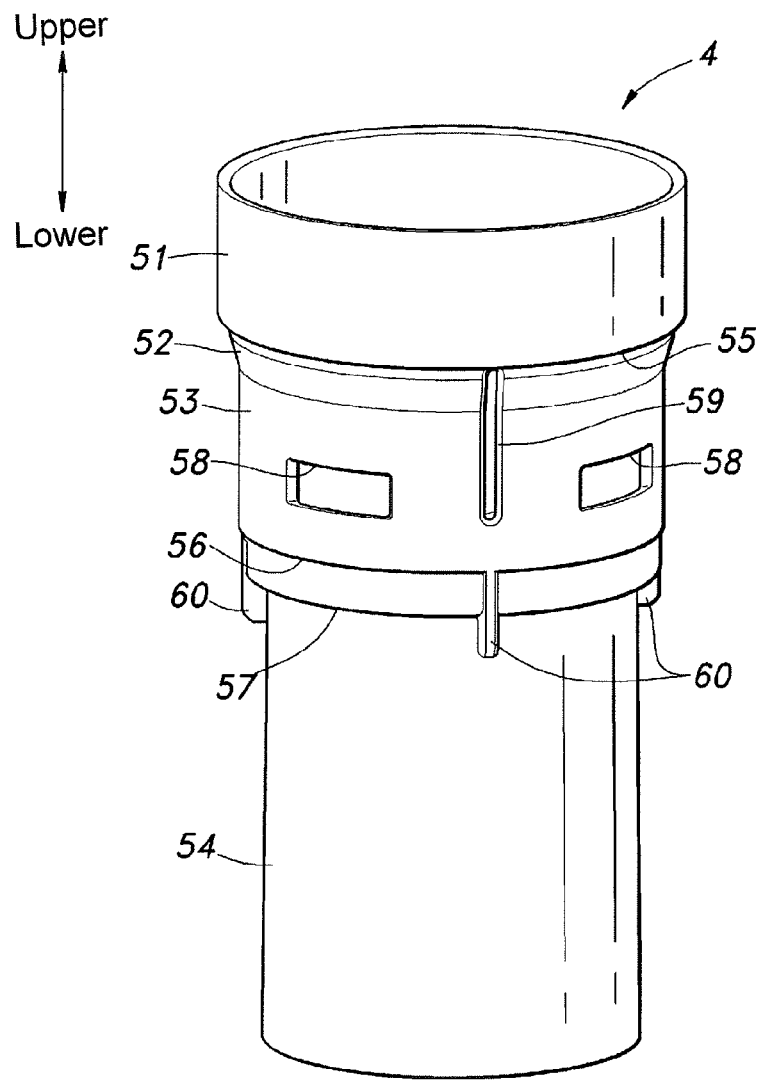
FIG. 7 is a perspective view of a third casing.

As shown in FIGS. 3, 4, and 6, the second casing 3 includes a cylinder portion 25. The cylinder portion 25 is formed to have a size to be fitted into the cylinder portion 11 of the first casing 2, and an upper half portion thereof is fitted into the cylinder portion 11. Thereby, the cylinder portion 25 of the second casing 3 is disposed in the same shaft as the cylinder portion 11 of the first casing 2, and a shaft line extends in the up-and-down direction. In an outer circumferential face of the cylinder portion 25, there is formed an O-ring groove 26 extending in a circumferential direction, and in the O-ring groove 26, there is fitted an O-ring 27 having flexibility. The O-ring 27 seals a gap between the outer circumferential face of the cylinder portion 25 and the inner circumferential face of the cylinder portion 11.

In an outer circumferential face of an intermediate portion in a longitudinal direction of the cylinder portion 25, there is projected a plurality of locking projecting pieces 30. In the present embodiment, four locking projecting pieces 30 are provided on the outer circumferential face of the cylinder portion 25 at equal intervals in the circumferential direction. Each locking projecting piece 30 has an L-shaped thin piece including a base portion 31 projecting outward in a radial direction from the outer circumferential face of the cylinder portion 25; and a circumferential wall portion 32 extending upward from an end of the base portion 31. The circumferential wall portion 32 is curved in the circumferential direction of the cylinder portion 25 in such a way as to face the outer circumferential face of the cylinder portion 25 maintaining a constant distance, and an outer face of the circumferential wall portion 32 has a circumferential face. The locking projecting piece 30 is formed in a thin piece shape so as to have flexibility, and the circumferential wall portion 32 can approach and separate relative to the outer circumferential face of the cylinder portion 25.

In the circumferential wall portion 32, there are formed second-casing-side locking holes 33 penetrating in a thickness direction (in the radial direction of the cylinder portion 25). In the present embodiment, the second-casing-side locking hole extends to the base portion 31 as well, and a hole edge reaches up to the outer circumferential face of the cylinder portion 25. In each locking projecting piece 30, the circumferential wall portion 32 extends onto the outer circumferential face of the cylinder portion 11 of the first casing 2 and the first-casing-side locking claw 19, and the first-casing-side locking claw 19 is locked in the second-casing-side locking hole 33. At that time, the base portion 31 of the locking projecting piece 30 abuts against a lower end face of the cylinder portion 11. In this manner, the second casing 3 is connected to the first casing 2. Also, as shown in FIG. 6, there is formed a gap 34 between the locking projecting pieces 30 next to each other, and the guide rib 22 of the first casing 2 fits into the gap 34, so that a relative rotational position of the first casing 2 and the second casing 3 is determined.

In an upper end of the cylinder portion 25, there is provided a bulkhead 35. The bulkhead 35 is formed in a conical face shape whose center portion projects downward (to an inner side of the cylinder portion 25), and includes a communication hole 36 penetrating in the thickness direction in the center portion. In the center portion of an upper face of the bulkhead 35, there is projected a cylinder body 37 in such a way as to surround the communication hole 36. In the cylinder body 37, a shaft line extends in the up-and-down direction, and an upper end is closed so as to internally form a buffer chamber 38. As shown in FIGS. 3 and 4, in an internal space of the first casing 2 and the second casing 3, a space located above the bulkhead 35 and excluding the buffer chamber 38 is an upper chamber 41; and a space located below the bulkhead 35 is a lower chamber 42.

The cylinder body 37 is disposed in a position approximately in the same up-and-down direction as the exhaust pipe 18. On a side of a base portion (a lower portion) of the cylinder body 37, and opposing the exhaust port 20 side in the circumferential direction, there is formed a first ventilation hole 43 penetrating in the radial direction, and on a side facing the exhaust port 20 side in the circumferential direction, there is formed a second ventilation hole 44 penetrating in the radial direction. In the present embodiment, in order to maintain a structural strength of the cylinder body 37, a support column extending in the up-and-down direction is bridged inside the first ventilation hole 43 and the second ventilation hole 44 in such a way as to respectively divide the first ventilation hole 43 and the second ventilation hole 44 in two. The first ventilation hole 43 and the second ventilation hole 44 have approximately the same width in the circumferential direction. However, the first ventilation hole 43 extends higher than the second ventilation hole 44, and is formed to have a large opening area. Incidentally, in another embodiment, the second ventilation hole 44 may be omitted.

As shown in FIGS. 3, 4, and 6, in the upper face of the bulkhead 35, there is extended a plurality of ribs 45 in a radial manner. The ribs 45 reinforce the bulkhead 35, and have a function of collecting a small drop of a liquid (the fuel) existing on the upper face of the bulkhead 35 to become a big drop so as to lead to the communication hole 36. Also, in the upper face of the bulkhead 35, and in a portion between the second ventilation hole 44 and the exhaust port 20, there is projected a baffle wall 46 upward in such a way as to face the second ventilation hole 44. In the upper face of the bulkhead 35, and in a portion between the baffle wall 46 and the exhaust pipe 18, there is formed a notch 47. The notch 47 forms a smooth curved surface, and forms a portion of a pathway smoothly communicating with the exhaust port 20.

In the outer circumferential face of the cylinder portion 25, and in a portion lower than the locking projecting piece 30, there are projected second-casing-side locking claws 48. Each second-casing-side locking claw 48 includes an inclination face projecting outward in the radial direction as moving upward from a lower end; and a non-return face continuing to an upper end of the inclination face and facing upward. In the present embodiment, four second-casing-side locking claws 48 are provided at 90-degree intervals in the circumferential direction of the cylinder portion 25. In the inner circumferential face of the cylinder portion 25, there is formed a plurality of ribs projecting in the radial direction and extending in the longitudinal direction.

As shown in FIGS. 3, 4, 7, 8, and 9, the third casing 4 has a cylinder shape whose both upper and lower ends are open, and includes a ring portion 51, a tapered portion 52, an intermediate portion 53, and a skirt portion 54 in that order from the upper end. The intermediate portion 53 has a cylinder whose diameter is constant, and is formed to have a size such that the cylinder portion 25 of the second casing 3 can be internally fitted without wobbling. The tapered portion 52 has a truncated cone shape whose outer diameter and inner diameter are expanded in a tapered shape as moving upward from an upper end edge of the intermediate portion 53. The ring portion 51 has a cylinder continuing to an upper end of the tapered portion 52 and having a constant diameter. The diameter of the ring portion 51 is larger than the diameter of the upper end of the tapered portion 52, and at a boundary between the ring portion 51 and the tapered portion 52, there is formed a step portion 55. An inner diameter of the ring portion 51 is formed to have a size capable of abutting against the outer face of the circumferential wall portion 32 of each locking projecting piece 30 of the second casing 3. The skirt portion 54 continues to a lower end edge of the intermediate portion 53, and has a cylinder extending downward and having a constant diameter. The skirt portion 54 functions as an inflow hole for liquid or gas. The diameter of the skirt portion 54 is formed smaller than the diameter of the intermediate portion 53, and at a boundary between the skirt portion 54 and the intermediate portion 53, there are formed step portions 56 and 57. Incidentally, in another embodiment, the diameter of the ring portion 51 and the diameter of the upper end of the tapered portion 52 may be the same so as to omit the step portion 55, and the diameter of the skirt portion 54 and the diameter of the intermediate portion 53 may be the same so as to omit the step portions 56 and 57.

In a portion corresponding to the second-casing-side locking claw 48 of the intermediate portion 53, there is formed a third-casing-side locking hole 58 penetrating in a thickness direction (a radial direction). In the present embodiment, four third-casing-side locking holes 58 are provided at 90-degree intervals in a circumferential direction of the intermediate portion 53. In each third-casing-side locking hole 58, there is fitted the second-casing-side locking claw 48 so as to be respectively locked. Between two third-casing-side locking holes 58 next to each other in the intermediate portion 53, there is formed a long hole (a slit) 59 penetrating in the thickness direction and extending in a longitudinal direction (the up-and-down direction). An upper end of the long hole 59 extends into the tapered portion 52. However, the long hole 59 does not reach up to an upper end edge of the third casing 4. Preferably, as in the case of the present embodiment, the upper end of the long hole 59 is disposed in the upper end of the tapered portion 52, and is not formed in the ring portion 51. Preferably, a lower end of the long hole 59 extends up to a lower edge of the third-casing-side locking hole 58 in the longitudinal direction of the intermediate portion 53. The lower end of the long hole 59 may extend downward beyond the lower edge of the third-casing-side locking hole 58. In the present embodiment, two long holes 59 are formed, and are disposed in a mutually-symmetric position in the circumferential direction of the third casing 4.

In the step portions 56 and 57, and on an outer circumferential face of the skirt portion 54, there are projected reinforcement ribs 60 extending onto the outer circumferential face of the skirt portion 54 through the step portions 56 and 57 from a lower edge of the intermediate portion 53. Each reinforcement rib 60 is disposed in a position corresponding to the long hole 59 at least in the circumferential direction.

Figure 8:
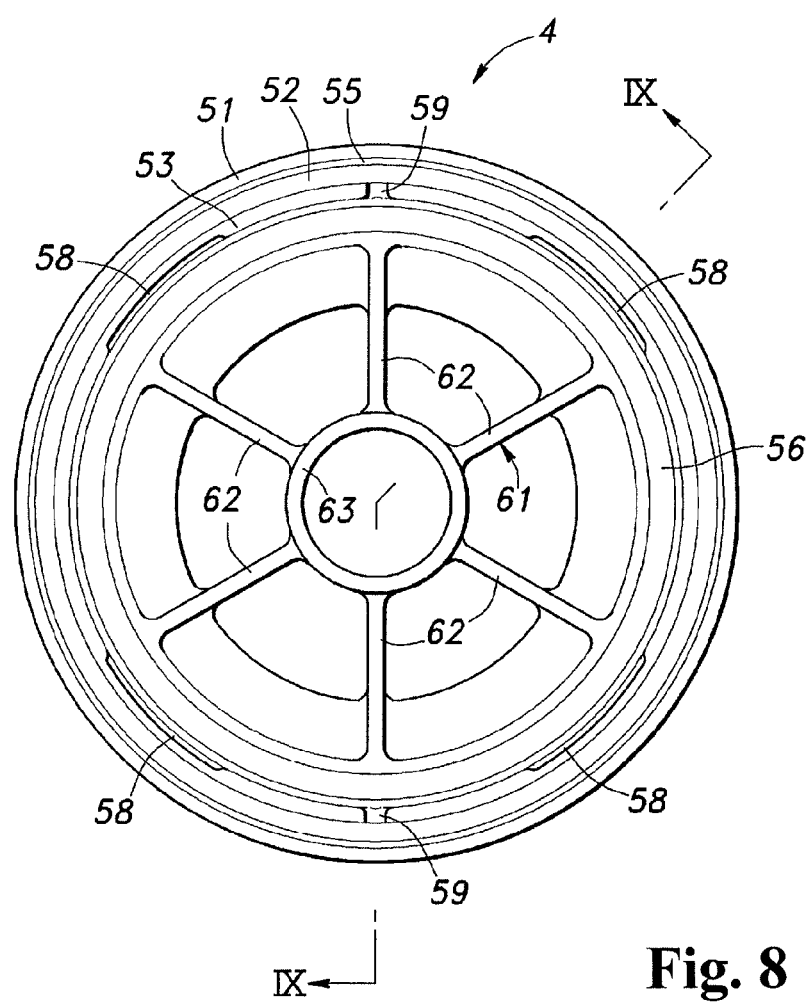
FIG. 8 is a plan view of the third casing.
Figure 9:
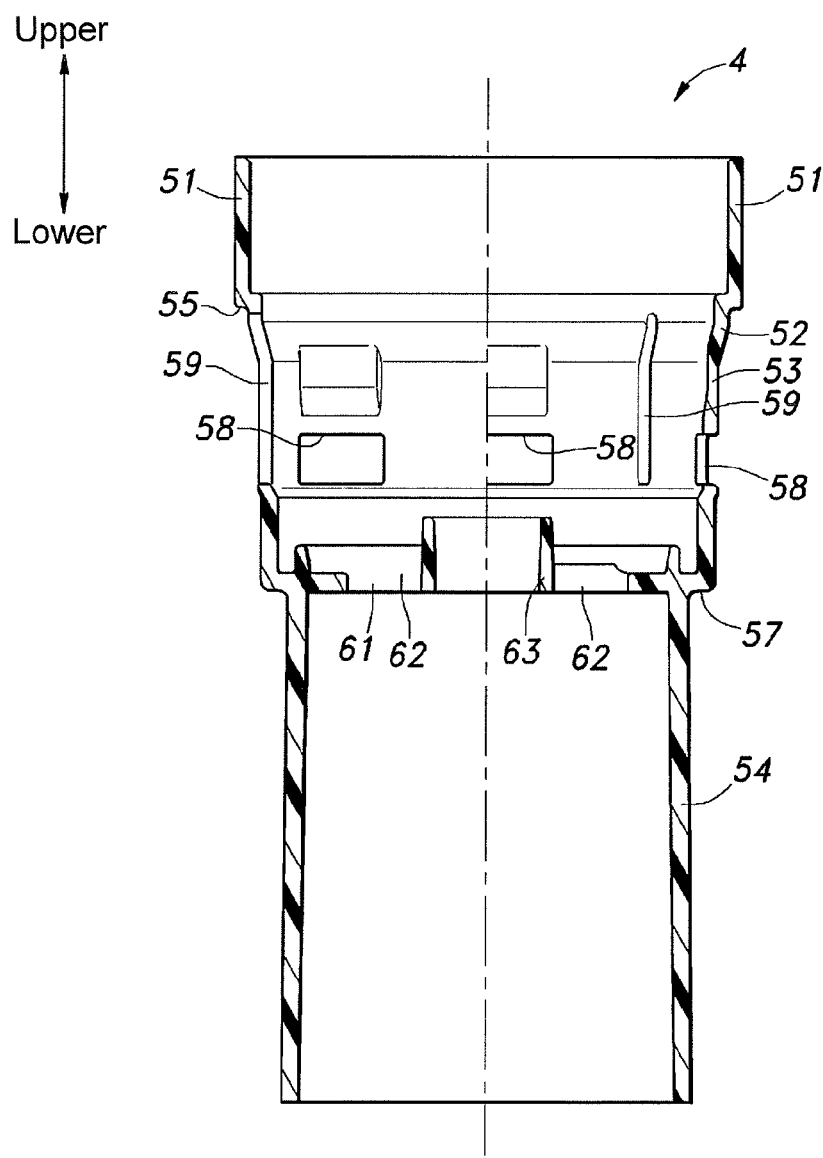
FIG. 9 is a cross-sectional view taken along a line IX-IX in FIG. 8.

As shown in FIGS. 3 and 8, at a boundary portion on inner circumferential face sides of the intermediate portion 53 and the skirt portion 54, there is projected a float support piece 61 projecting inward in the radial direction. As shown in FIG. 8, the float support piece 61 includes a plurality of beam portions 62 extending in the radial direction from the inner circumferential faces of the intermediate portion 53 and the skirt portion 54; and an annular beam portion 63 connecting projecting ends of the plurality of beam portions 62.

A connection between the second casing 3 and the third casing 4 is carried out by inserting a lower end portion of the cylinder portion 25 of the second casing 3 in which the first casing 2 is assembled from an upper end portion (the ring portion 51) side of the third casing 4. When the second casing 3 is inserted into the third casing 4, since the inner diameters of the ring portion 51 and the tapered portion 52 are expanded relative to the intermediate portion 53, the second-casing-side locking claw 48 cannot contact with the ring portion 51 and the tapered portion 52. Consequently, an insertion resistance of the second casing 3 relative to the third casing 4 diminishes. Also, since the intermediate portion 53 and the tapered portion 52 have lower rigidity by the long hole 59 so as to easily bend, an insertion resistance during a time when the second-casing-side locking claw 48 crosses the intermediate portion 53 to reach the third-casing-side locking hole 58 diminishes. Especially, at a boundary between the tapered portion 52 and the intermediate portion 53, there is formed an angle ridge portion so as to be difficult to bend. Accordingly, by forming the long hole 59, the insertion resistance can be arbitrarily lowered so as to facilitate an insertion operation. In another embodiment, the number of the long hole 59, a width in the circumferential direction of the third casing 4, and a length in the longitudinal direction of the third casing 4 may be changed so as to arbitrarily adjust the insertion resistance of the second casing 3 relative to the third casing 4. The lower end portion of the cylinder portion 25 of the second casing 3 abuts against an inner face side of the step portion 56 of the third casing 4 so as to control an insertion position of the second casing 3 relative to the third casing 4.

In a state wherein the second-casing-side locking claw 48 is locked in the third-casing-side locking hole 58, an inner circumferential face of the ring portion 51 abuts against outer faces of four locking projecting pieces 30 so as to sandwich the locking projecting pieces 30 with the outer circumferential face of the cylinder portion 11 of the first casing 2. Thereby, flexure of the locking projecting piece 30 is controlled, and locking the first-casing-side locking claw 19 into the second-casing-side locking hole 33 becomes difficult to be released. The ring portion 51 is annularly formed, includes the step portion 55 in a lower edge so as to be difficult to be deformed, and can reliably control the flexure of the locking projecting piece 30.

As shown in FIGS. 3 and 4, in a space (the lower chamber 42) surrounded by the cylinder portion 25 and the bulkhead 35 of the second casing 3, and the float support piece 61 of the third casing 4, there is housed the float valve 5. The float valve 5 is formed by combining a float body 71, a receiving seat 72, and a valve body 73. The float body 71 includes a cylinder portion extending in the up-and-down direction; a top plate 76 closing an upper end portion of the cylinder portion; and an expanded head portion 77 projecting upward from the top plate 76 and extending an upper end in a radial direction. In the top plate 76 and the expanded head portion 77, there is formed a through hole (the reference symbol is omitted) penetrating the respective top plate 76 and expanded head portion 77 in the up-and-down direction.

The receiving seat 72 has a circular plate shape, and includes a locking claw in a circumferential edge portion thereof. In the receiving seat 72, the locking claw is locked in the expanded head portion 77 with room, and is supported in an upper face of the expanded head portion 77 to be capable of tilting and falling (displaceably). The valve body 73 has a circular plate shape, includes a packing 81 having flexibility in the center portion, and includes a locking claw in the circumferential edge portion. In the valve body 73, the locking claw is locked in the expanded head portion 77 with a room, and is supported in an upper face of the receiving seat 72 to be capable of tilting and falling (displaceably). Thereby, the valve body 73 is supported in an upper end of the float body 71 through the receiving seat 72 to be capable of tilting and falling.

The float valve 5 is housed in the lower chamber 42 movably up and down. In the float valve 5, an outer circumferential face of the float body 71 slidingly contacts with projecting ends of the plurality of ribs 49 projecting in the inner circumferential face of the cylinder portion 25 of the second casing 3 so as to maintain a posture inside the lower chamber 42. Also, the float body 71 slidingly contacts with the rib 49 so as to form a space between the float valve 5 and the inner circumferential face of the cylinder portion 25. When the float valve 5 moves upward in the lower chamber 42, the valve body 73 abuts against a circumferential edge portion of the communication hole 36 of the bulkhead 35 through the packing 81 so as to close the communication hole 36.

Between a lower face of the top plate 76 of the float body 71 and the float support piece 61, there is installed a compression coil spring 83. The compression coil spring 83 urges the float valve 5 upward, i.e., to a bulkhead 35 side. Incidentally, an urging force of the compression coil spring 83 is set in a strength which does not allow the float valve 5 to reach the bulkhead 35 in a state wherein buoyancy of the fuel does not act on the float valve 5.

The second casing 3, the third casing 4, and the float body 71, the receiving seat 72, and the valve body 73 of the float valve 5 are formed by resin by injection molding, and the resin may be, for example, polyacetal.

As shown in FIG. 3, the exhaust valve device 1 formed in the above-mentioned manner is inserted into an attachment hole 102 formed in an upper wall 101 of a fuel tank 100 in such a way as to communicate an inside and an outside so as to be connected. The exhaust valve device 1 is connected to a circumferential edge portion of the attachment hole 102 in the joint surface 17 of the flange 15 of the first casing. A connection between the joint surface 17 and the upper wall 101 is carried out by the thermal welding or vibration welding, bonding by an adhesive agent, and the like. In a state wherein the exhaust valve device 1 is attached to the fuel tank 100, the skirt portion 54 of the third casing 4 is disposed inside the fuel tank 100, and an opening end of the exhaust pipe 18 is disposed outside the fuel tank 100. In the exhaust pipe 18, there is connected a connection pipe (a connection hose) connected to a canister, and the exhaust port 20 and the canister communicate with each other.

Next, an operation of the exhaust valve device 1 will be explained. In a case wherein a liquid level of a liquid fuel (gasoline, light gas oil, and the like) inside the fuel tank 100 is high, and the liquid fuel enters into the lower chamber 42 through the skirt portion 54, as shown in FIG. 4, the float valve 5 receives the buoyancy by the fuel and the urging force of the compression coil spring 83, and moves upward inside the lower chamber 42 so as to close the communication hole 36 (a closed valve state of the exhaust valve device 1). In that state, gas (including air and fuel vapor) and the liquid fuel inside the fuel tank 100 cannot flow to the outside of the fuel tank 100. Thus, in a case wherein the liquid level of the fuel inside the fuel tank 100 is high, the exhaust valve device 1 closes the communication hole 36 and prevents the liquid fuel from flowing out to the outside of the fuel tank.

In a case wherein the liquid level of the liquid fuel rapidly ascends, and prior to closing the communication hole 36 by the float valve 5, the liquid fuel or an air bubble included in the liquid fuel is spewed up, and passes through the communication hole 36, the liquid fuel or the air bubble passed through the communication hole 36 is mostly trapped in the buffer chamber 38. Even in a case wherein the liquid fuel or the air bubble flows out of the buffer chamber 38, since the opening area of the first ventilation hole 43 is larger than that of the second ventilation hole 44, the liquid fuel or the air bubble flows out of a first ventilation hole 43 side into the upper chamber 41. Namely, since the liquid fuel and the like are led to the side opposing the exhaust port 20 side, a possibility that the liquid fuel and the like pass through the exhaust port 20 to flow to the outside is reduced. Also, even if the liquid fuel and the like pass through the second ventilation hole 44, the baffle wall 46 blocks the liquid fuel and the like from flowing into the exhaust port 20 so as to control an outflow into the outside.

In a case wherein the liquid level of the liquid fuel inside the fuel tank 100 is low, and the buoyancy by the liquid fuel is not generated in the float valve 5, as shown in FIG. 3, the float valve 5 is located downward inside the lower chamber 42 so as to become a state supported in the float support piece 61 (an open valve state of the exhaust valve device 1). In that state, the gas inside the fuel tank 100 enters into the exhaust valve device 1 from the skirt portion 54, and can flows to the outside of the fuel tank 100 through the lower chamber 42, the communication hole 36, the buffer chamber 38, the first ventilation hole 43 or the second ventilation hole 44, the upper chamber 41, and the exhaust port 20 in order.

As shown in FIG. 10, in the exhaust valve device 1 of the present embodiment, since the opening area of the first ventilation hole 43 is larger than that of the second ventilation hole 44, the gas mostly passes through the first ventilation hole 43, and is led to the side opposing the exhaust port 20 of the upper chamber 41. After the gas entered into the upper chamber 41 through the first ventilation hole 43 flows to the inner circumferential face of the cylinder portion 11, the lower face of the circular plate 12, and a surface side of the corner portion 13, a direction of the flow is curved by the aforementioned faces, and the gas flows to the exhaust port 20 side along the aforementioned faces. Especially, in the corner portion 13, the curvature on the side opposing the exhaust port (a side facing the first ventilation hole 43) in the circumferential direction is smaller than the curvature on the exhaust port 20 side (a side facing the second ventilation hole 44) so as to form a smoother curved surface, so that the gas flowing into the upper chamber 41 from the first ventilation hole 43 can be led to the exhaust port 20 side effectively. Namely, a pressure loss of the gas inside the upper chamber 41 can be reduced so as to smoothly circulate the gas.

By reducing the curvature of the corner portion 13, the lower edge 14 of the corner portion 13 extends to a lower side so as to decrease a volume of the upper chamber 41. However, by changing a portion on the exhaust port 20 side of the corner portion 13 in such a way as to increase the curvature relative to a portion on the side opposing the exhaust port 20, a decrease of the volume of the upper chamber 41 can be reduced. Namely, by reducing the corner portion 13 by increasing the curvature, and by retracting upward, the upper chamber 41 can be expanded. The portion on the exhaust port 20 side of the corner portion 13 does not become a resistance to the flow of the gas compared to the portion on the side opposing the exhaust port 20 so as to have a low impact on the pressure loss of the gas. Also, by increasing the volume of the upper chamber 41 and increasing an area in a cross section of a flow passage, the pressure loss of the gas can be further reduced.

The specific embodiment has been explained hereinabove, however, the present invention is not limited to the embodiment described hereinabove, and can be widely transformed. A structure of the float valve 5 or the flange 15 can be arbitrarily modified.

Explanation of Symbols

1 ... an exhaust valve device, 2 ... a first casing, 3 ... a second casing, 4 ... a third casing, 5 ... a float valve, 11 ... a cylinder portion, 12 ... a circular plate, 13 ... a corner portion, a lower edge, 19 ... a first-casing-side locking claw, 20 ... an exhaust port (an exhaust hole), 25 ... a cylinder portion, 30 ... a locking projecting piece, 33 ... a second-casing-side locking hole, 35 ... a bulkhead, 36 ... a communication hole, 37 ... a cylinder body, 38 ... a buffer chamber, 41 ... an upper chamber, 42 ... a lower chamber, 43 ... a first ventilation hole, 44 ... a second ventilation hole, 46 ... a baffle wall, 48 ... a second-casing-side locking claw, 51 ... a ring portion, 52 ... a tapered portion, 53 ... an intermediate portion, 54 ... a skirt portion (an inflow hole), a third-casing-side locking hole, 59 ... a long hole, 61 ... a float support piece, 71 ... a float body, 72 ... a receiving seat, a valve body, 75 ... a cylinder portion, 81 a packing, 100 ... a fuel tank, 101 an upper wall

What is claimed is:

1. An exhaust valve device for a fuel tank, comprising:
   a casing provided to pass through an upper wall of a fuel tank, and partitioning an inside into an upper chamber and a lower chamber by a bulkhead including a through hole;
   an inflow hole communicating the lower chamber and an inside of the fuel tank;
   an exhaust hole communicating a side portion of the upper chamber and an outside of the fuel tank; and
   a float valve displaceably supported in the lower chamber, and ascending by receiving buoyancy from a fuel flown into the lower chamber through the inflow hole so as to close the through hole,
   wherein a portion defining the upper chamber of the casing includes a cylinder portion and a circular plate closing an upper end of the cylinder portion,
   the exhaust hole is formed in the cylinder portion,
   on an upper chamber side of the bulkhead, a cylinder body whose upper portion is closed to cover the through hole is arranged approximately coaxially with the cylinder portion, and a buffer chamber is defined between the cylinder body and the bulkhead,
   the buffer chamber communicates with the lower chamber by the through hole,
   in a side wall on a side opposing an exhaust hole side of the cylinder body, a first ventilation hole communicating the buffer chamber and the upper chamber is formed,
   at a boundary portion between an inner circumferential face of the cylinder portion and a lower face of the circular plate, a corner portion having a curved surface shape smoothly connecting between the inner circumferential face of the cylinder portion and the lower face of the circular plate is extended, and
   a curvature of the corner portion is smallest on a side opposing a side forming the exhaust hole, and gradually increases as moving toward a side forming the exhaust hole in a circumferential direction.

2. An exhaust valve device for a fuel tank according to claim 1, wherein a second ventilation hole having an opening area smaller than that of the first ventilation hole is formed in the side wall on the exhaust hole side of the cylinder body.

3. An exhaust valve device for a fuel tank according to claim 2, wherein a baffle wall facing the second ventilation hole projects in an upper chamber side portion of the bulkhead and located between the second ventilation hole and the exhaust hole.

4. An exhaust valve device for a fuel tank according to claim 1, wherein in a portion on the upper chamber side of the bulkhead, a portion provided with the through hole is concaved to a lower chamber side to form a conical shape.

* * * * *